SELECTIVE CALLING SYSTEM FOR A MAIN STATION AND SATELLITES

Filed June 21, 1967 4 Sheets-Sheet 1

Inventor
J. E. TURRIERE
By D. P. Warner
Attorney

Oct. 6, 1970 J. E. TURRIERE 3,532,987

SELECTIVE CALLING SYSTEM FOR A MAIN STATION AND SATELLITES

Filed June 21, 1967 4 Sheets-Sheet 3

United States Patent Office 3,532,987

Patented Oct. 6, 1970

3,532,987

SELECTIVE CALLING SYSTEM FOR A MAIN STATION AND SATELLITES

Jean Emile Turriere, Paris, France, assignor to International Standard Electric Corporation, New York, N.Y., a corporation of Delaware Filed June 21, 1967, Ser. No. 647,799
Claims priority, application France, July 12, 1966, 69,049
Int. Cl. H04j 3/12
U.S. Cl. 325—55 4 Claims

ABSTRACT OF THE DISCLOSURE

Selective calling system primarily designed for a meteorological network wherein a satellite interrogates in time succession a multiplicity of secondary stations (balloons, buoys, etc.). Each interrogation cycle starts with a synchronization signal followed by call pulses separated by a time T1 or T3. Each secondary station has a selection counter to which these pulses are applied and it delivers a selection signal when said station is selected. A return pulse is then transmitted which is received by the satellite and controls the sending of the next pulse with a delay T3. When a pulse has not selected the corresponding station, which means that it is out of sight, the next pulse is sent with a delay T1, said time interval defining the range of the system.

The present invention concerns a selective calling system for calling, from a main station, a great number of secondary stations belonging to a network.

More precisely, the main station calls successively, in the course of an interrogation cycle, all the secondary stations of the network, whether these may answer or not. The time which elapses between the calling of two successive stations is longer when the called station answers than when it does not answer, so that the duration of an interrogation cycle is variable and is reduced to a minimum value. When a station answers, an exchange of information takes place between this latter and the main station.

Such a selective calling system may be used in a telephone network, in a radio-taxi network, in a global meteorological network, etc.

Thus, by way of example, a network of this last type in which the main station is carried by a polar or quasi polar orbit satellite, and the secondary stations by balloons, buoys, isolated ground station, etc. . . . will be described. The interrogation of a secondary station by the satellite provides information stored in a memory and transmitted later to ground stations when said satellite passes within their range.

At a given time, the main satellite station can enter into communication only with the secondary stations located at a distance smaller than the maximum range (two to four thousand kilometers). If the distribution of these secondary stations is global, it may be admitted, as a first approximation, that about 10% of said stations are in sight at a given instant, and that they answer to the interrogation by sending data to the satellite.

Besides, when the secondary stations are moving stations (balloons, for instance) the satellite must carry out, in order to localize one of said stations, two distance measurements at intervals sufficiently close in order that the displacement of the secondary stations should be negligible. This condition fixes a priori the interrogation frequency F of the stations.

In one of the known systems, $n=500$ observation stations are interrogated successively during one interrogation cycle of fixed duration 1/F. Since it is necessary to reserve, for each station, a time interval $To$ for the transmission of data, one has $$\frac{1}{F}=n \times To$$

i.e. the duration of the cycle is proportional to the number of stations which is then limited to a relatively low value.

In another known system, one thousand to three thousand stations are available, out of which at a given instant, only those which are assumed to be at a distance lower than the maximum range are interrogated. To this effect, the interrogation is programmed in a ground station in accordance with the data received previously, and this program is transmitted to the satellite. A call cycle concerns thus only the stations which are supposed to be in sight of the main station and, for the same value of F, the number $n$ is multiplied by a factor 10 with respect to the preceding system.

Nevertheless, it is realized that this programming is a complex operation which requires the use of a computer in the ground station, the transmission of the program to the satellite and its storage in a memory and, last, a very high reliability of the whole system starting from the computer and the ground transmission equipment up to the electronic equipment of the satellite and of the secondary stations themselves. In effect, if an accidental interruption of the process takes place, it is very difficult to know once again the geographical situation of the secondary stations.

The object of the present invention is thus to achieve a selective calling system of a big number of observation stations distributed all over the globe surface, the said system requiring no particular installation on the ground, except the one or several stations which receive the informations.

The present invention will be described with refernce to the accompanying drawings in which:

FIGS. 1(*a*) to 1(*k*) represent some symbols used in the FIGS. 3 and 5;

FIGS. 2(*a*) to 2(*g*) represent a number of diagrams of signals summarizing the operation of the system;

FIG. 3 represents the circuits used in the satellite for elaborating the interrogation signals;

FIGS. 4(*a*) to 4(*g*) represent diagrams of signals concerning the operation of the interrogation selector;

FIG. 5 represents the circuits located on board of a station;

FIGS. 6(*a*) to 6(*i*) represent diagrams of signals limited to the clearing of the selector KQ.

Before starting the description of the invention, we shall briefly review the principle of notations in logical algebra which will be used in certain cases, in order to simplify the writing in the description of the logical operations. The subject is treated extensively in numerous papers and in particular in the book "Logical design of digital computers" by Mr. Phister (J. Wiley, publisher).

Thus, if a condition characterized by the presence of a signal is written A, the condition characterized by the absence of said signal will be written $\bar{A}$.

These two conditions are linked by the well known logical relation $A \times \bar{A}=O$, in which the sign "x" is the symbol of the coincidence logical function or "AND" function.

If a condition C appears only if the conditions A and B are simultaneously present, one write $A \times B=C$ and this function may be carried out by means of a coincidence or AND circuit.

If a condition C appears when at least one of two conditions E and F is present, one writes $E+F=C$ and this function is carried out by means of a mixing gate or OR circuit.

Since these AND and OR logical functions are commutative, associative and distributive, one may write:

$A+B=B+A$;
$A\times(B+C)=A\times B+A\times C$;
$(A+B)(C+D)=A\times C+A\times D+B\times C+B\times D$; etc.

One will also specify, in relation with the FIG. 1, the meaning of some particular symbols used in the drawings which come with the description of the invention. Thus:

FIG. 1(*a*) represents a simple AND circuit;

FIG. 1(*b*) represents a simple OR circuit;

FIG. 1(*c*) represents a multiple AND circuit, which comprises, in the case of the example, four AND circuits, having each a first input terminal connected to each one of the conductors **91*a* and a second input terminal connected to a common conductor 91*b***;

FIG. 1(*d*) represents an AND circuit having two input terminals **91*f*, 91*g* and which is blocked when a signal is applied over the input 91*f***;

FIG. 1(*e*) represents a differentiating circuit;

FIG. 1(*f*) represents a delay circuit;

FIG. 1(*g*) represents a bistable circuit or "flip-flop" to which a control signal is applied over one of its input terminals 92–1 or 92–0 in order to set it in the 1 state or to reset it in the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{\text{B1}}$;

FIG. 1(*i*) represents a flip-flop counter which counts the pulses applied to its input terminal **94*c* and which is cleared by the application of a signal on its input 94*d*. The 1 outputs of the flip-flops are connected to the output conductors 94*e***;

FIG. 1(j) represents a decoder which, in the case of the example, transforms a four-digit binary code group applied over the group of conductors **94*a* into a 1 out of 16 codes, so that a signal appears on only one among the sixteen conductors 94*b*** for each one of the code groups applied at the input;

FIG. 1(*k*) represents a selector constituted by the association of a register and of a decoder such as they are shown in FIGS. 1(*i*) and 1(*j*).

Figure 1:
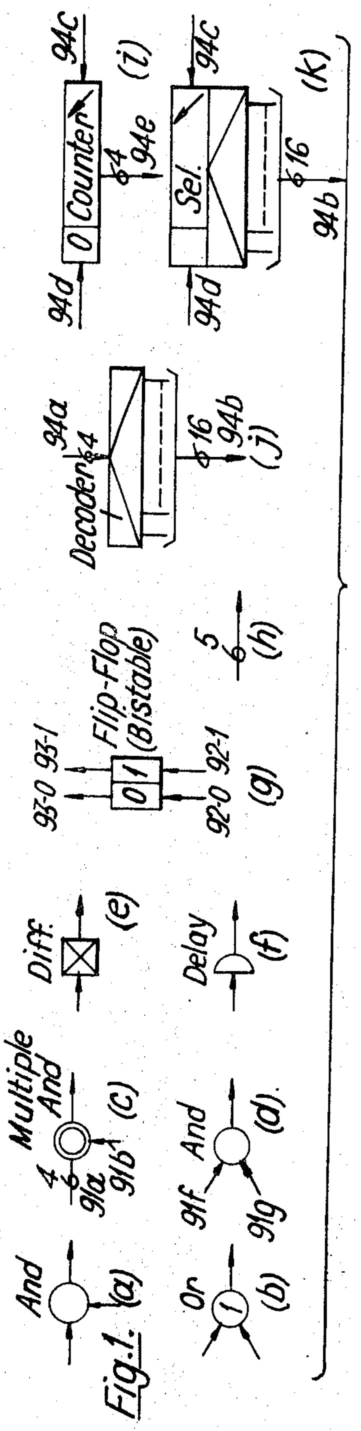
FIG. 1(*h*) represents a group of several conductors, five in the considered example.

The global observation system controlled by a main station located on board of a satellite according to the present invention operates in the following way:

In the course of a call cycle, all the secondary stations are interrogated by the main section, by the successive transmission of calling information characterizing each of them. When a station receives the calling information which is assigned to it, it retransmits said information.

During the time interval T1 which follows immediately the transmission of a call information, the main station switches to the listening mode and, if it has not received at the end of this time the information retransmitted by the called secondary station, it decides that said station is out of range, and the next secondary station is called. The time T1 defines the range P of the main station. When an answer is received, i.e. if the called secondary station is in sight, a time interval T'2 for the reception of the data transmitted by this station is reserved, following the time T1. At the end of this time interval, a new call information is transmitted for the interrogation of the next station, etc.

For P=3,750 km., one has T1=25 ms., and if one chooses T'2≃100 ms., for instance, the duration of one cycle, for $n$=1,000, is T$c$≃35 seconds (according to the hypothesis that at a given instant 10% of the balloons are in sight).

A selective calling information may be constituted either by a binary code received, in a secondary station, by a suitable selection unit (for instance, a shift register to which a decoder is associated) or by a series of pulses received by a selector which delivers a signal when the number of pulses received corresponds to the number which characterizes the station.

By way of a non limitative example, one will describe a system in which the call information are constituted by successive pulses. This requires the transmission by the main station of a synchronization signal which characterizes the beginning of each interrogation cycle.

Besides, one must provide for devices enabling first to reduce to the minimum in each secondary station the selection errors, and second to make sure on board of the satellite or in the ground stations that the informations received do come from the interrogated secondary station.

The secondary stations 1, 2, 3 . . . *j* . . . *n*, . . . are identified by a call code comprising respectively 1, 2, 3 . . . *j* . . . *n* pulses. After the transmission of the synchronization signal, the first pulse is intended for selecting the station 1, the second pulse is intended for selecting the station 2, etc. On board of a secondary station, the receiving circuit is designed in such a way as it is blocked, up to the beginning of the next interrogation cycle, if a pulse is not received at the times expected or if said station has already been selected. This enables to reduce to a minimum the counting errors during the selection due to the two following reasons: A spurious signal A spurious signal received as a call signal but which does not arrive at the expected time;

The selection of the station *j* by the $(2j)_{\text{th}}$, $(3j)_{\text{th}}$ pulse, etc. . . . when $j\leqslant n/2$.

Besides, the first transmitted by a secondary station interogated is a binary code which characterizes it, thus enabling to avoid, in case of disturbances during interrogation or during transmission of the signals, identification errors.

Figure 2:
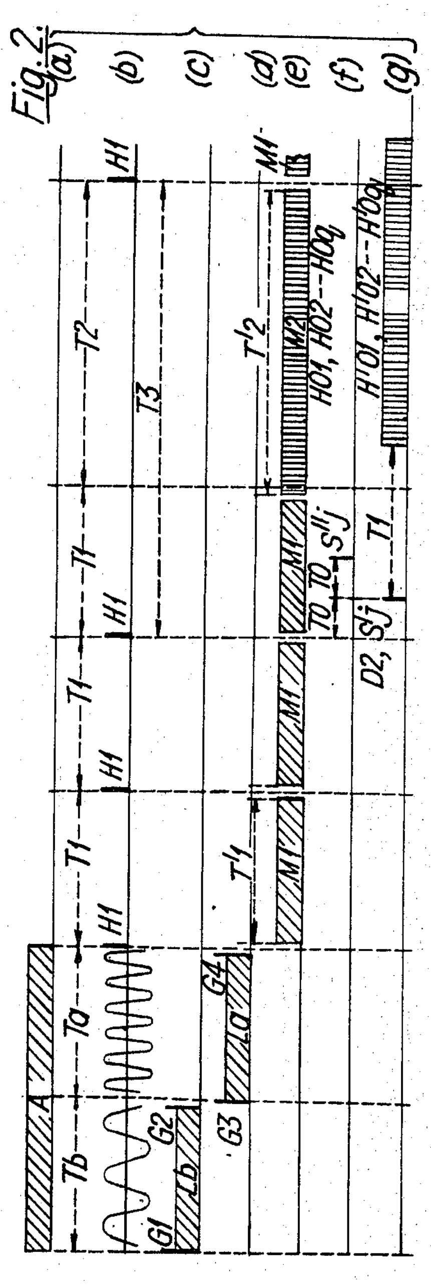

The FIGS 2(*a*) to 2(*g*) represent a certain number of diagrams of signals summarizing the operation of this system.

At the beginning of a cycle, a signal A—FIG. 2(*a*)—controls the transmission by the satellite of the synchronization signal. This latter shown in FIG. 2(*b*) is constituted by two sinusoidal signals of frequency F*b* and F*a* transmitted during the times T*b* and T*a* defined by the signals L*b*—FIG. 2(*c*) and L*a*—FIG. 2(*d*).

After the synchronization signal (condition $\overline{\text{A}}$) a succession of call pulses H1 spaced either by a time T1 or by a time $T3=T1+T'2$—see FIG. 2(*b*)—according to whether the secondary station interrogated is out of range or in sight are elaborated. The transmission of each pulse H1 is followed by the elaboration of a signal M1—FIG. 2(*e*)—defining a time interval of duration T'1 slightly less than T1 during which the satellite operates as a receiver. The fact that the secondary station interrogated is in sight of the satellite during this time T'1, is characterized by the reception if a signal S''*j*—FIG. 2(*f*) coming from the retransmission, by said station, of the pulse H1. The next pulse H1 is then spaced by a time T3 with respect to the preceding one, the time interval T'2 being reserved to the data exchange between the main station and the interrogated station.

It will be noted that the measure of the time delay between signals S''*j* and H1 may be used for computing the distance between the main station and the selected secondary station.

Figure 3:
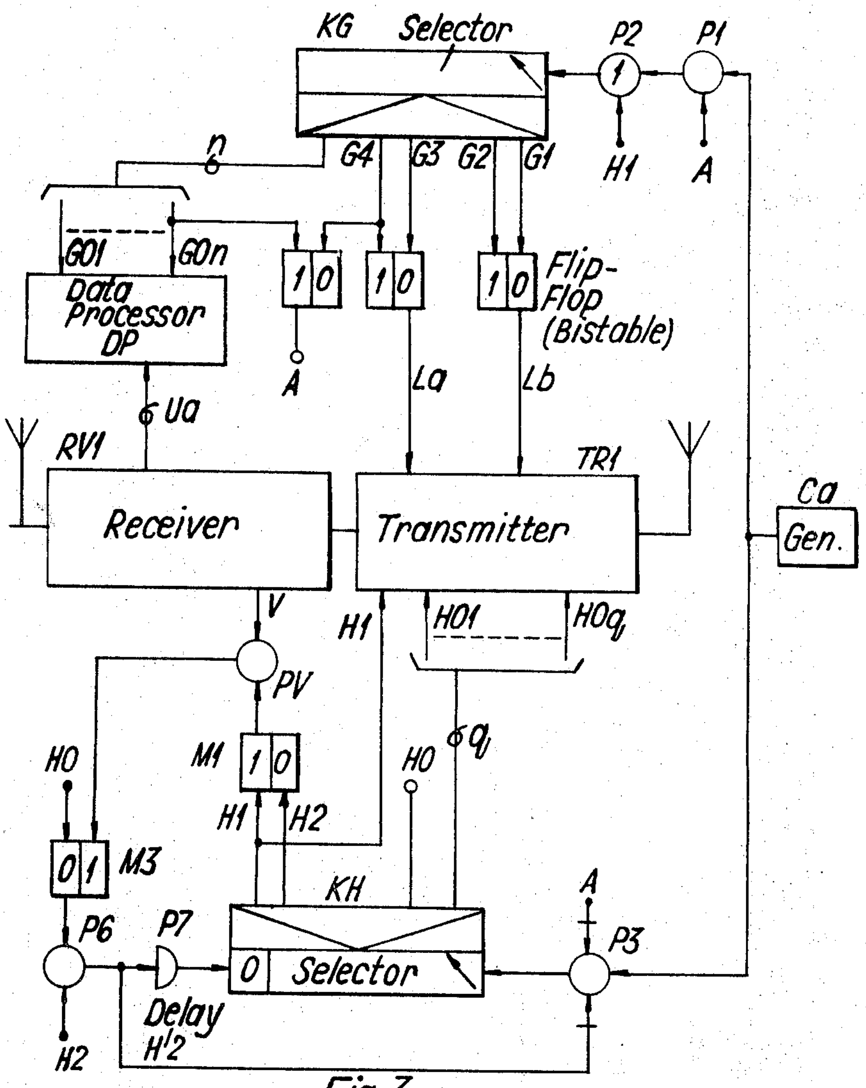

FIG. 3 represents the circuits which are used in the satellite for elaborating the signals shown in the FIGS. 2(*a*) to 2(*g*). They comprise:

the selector KG which will be called "cycle controller," which controls the flip-flops L*b*, L*a*, A;

the interrogation selector KH which controls the flip-flops M1 and M3;

the generator of advance signals C$a$ which supplies signals of frame period $t$ and of duty factor 0, 5.

The elements referenced TR1 and RV1 represent respectively the transmitter and the receiver located on board the satellite and the element DP represents the circuit which processes the data received from the interrogated stations.

One will be set:

$T'1 = p1 x t$
$T'2 = p2 x t$
$Ta = Tb = p3 x t.$

The coefficients $p1$, $p2$, $p3$ are integer numbers and one chosen, as it appears on FIG. 2($b$), $p2 > p1$. In practice, one may choose F$b$=1, 1 kc., F$a$=10 kc., T$a$=T$b$=T1 and T2=4 T1.

The selector KG comprises the outputs G1 to G4 and Gol to Gon on which appear signals representing the condition at positions of its counter which are indicated in the table I hereafter.

Table I

| Signal: | Counter position |
|---|---|
| G1 | $0=2p3+2+n$ |
| G2 | $p3$ |
| G3 | $P3+1$ |
| G4 | $2p3+1$ |
| Gol | $2p3+2$ |
| * * * | * * |
| Gon | $2p3+1+n$ |

At the end of one cycle; the signal Gon controls the setting to the 1 state of the flip-flop A and the advance signals supplied by the generator C$a$ are applied to the selector KG through the gates P1 and P2. As it will be seen further on, the mixing gate P2 cannot receive the pulse H1 as long as the condition A exists. The selector sets then to the position zero ($2p3+2+n=0$) delivering a signal G1 which controls the elaboration of the signal L$b$. This signal lasts up to the time when the selector delivers a signal G2 so that one has effectively $Tb=p3xt$. In the same way, the signal L$a$ is bound by the signals G3 and G4, the signals L$b$ and L$a$ being separated by a time $t$. The signal G4 controls also the resetting to the 0 state of the flip-flop A so that the gate P1 is blocked and the selector can no more receive advance signals from the generator C$a$.

The interrogation selector KH comprises the output terminals H0, H1, H2, Hol to Hoq, the Table II giving the correspondences between the signals appearing on these terminals and the numbers stored in its counter which presents ($p1+p2+3$) distinct states.

Table II

| Signal: | Counter position |
|---|---|
| H0 | $0=p1+p2=3$ |
| H1 | 1 |
| H2 | $p1+1$ |
| Hol | $p1+2$ |
| * * * | * * |
| Hoq | $p1+p2+2$ |

It will be assumed that initially the selector KH supplies a signal H0 and that the flip-flops M1 to M3 are in the 0 state. During the sending of the synchronization signals, under the control of the cycle controller KG, the condition A controls the blocking of the gate P3 and the selector KH, which does not receive any advance signals, remains in the position H0 so that the gate P2 does not receive pulses H1. At the end of this operation one has the logical condition $\overline{H'2}x\overline{A}$ and the gate P3 is activated.

The first signal supplied by the generator C$a$ controls the production of a pulse H1 which sets the flip-flop M1 to the 1 state and which is sent to the transmitter TR1 in order to be transmitted as a call pulse. The next signal controls the advance of the selector KH by one position so that the duration of this pulse is $t$. The pulse H1, applied to the OR circuit P2, controls also the advance by one position of the cycle controller KG which thus shifts from the position $2p3+1$ (signal G4) to the position $2p3+2$ (signal G$o1$). This signal, transmitted to the circuit DP, characterizes the calling of the first station of the network.

If the called station is out of sight, no return signal is received during the time interval T1 which follows the pulse H1 and the $(p1+1)^{th}$ advance signal controls the elaboration of a signal H2 which resets the flip-flop M1 to the 0 state and activates the gate P6. The signal H'2 of duration slightly different from $t$ which is delivered by this gate is applied to the gate P3 for blocking it as well as to the delay circuit P7 which controls the clearing of the selector KH. The duration of one advance signal being shorter than that of the signal H'2 (form factor 0, 5, vis. a duration $t/2$) the delay brought by the circuit P7 is so chosen that the signal it delivers is centered on the advance signal. It results therefrom that the selector does not receive advance signals during its clearing. The next advance signal controls the elaboration of a new pulse H1 for the interrogation of the next station, etc.

If the interrogated station is in sight one receives, when the flip-flop M1 is in the 1 state, (i.e. the condition M1 defines the time T'1, FIG. 2($d$) a signal S''$j$ as shown in FIG. 2($f$). At this time, the receiver RV1 delivers a signal V which is applied by the gate P4 to the flip-flop M3 which sets to the 1 state and thus can no longer control the clearing of the selector KH. This latter continues to receive advance signals, the $(p1+1)^{th}$ controlling, as in the preceding case, the resetting to the 0 state of the flip-flop M1. As it may be seen, in Table II, the $p2$ following signals are used for obtaining the program signals H$ol$ to H$oq$ ($q \leqslant p2$) which are applied to the transmitter TR1 for controlling the data exchange between the satellite and the interrogated station.

When the selector delivers a signal H$oq$, the two next advance signals control respectively the storage of the number zero in the counter (see Table II) and the transmission of a call pulse H1. As has been seen previously, each of these pulses controls the advance, by one position, of the cycle controller KG which was, during the occurrence of the signal $\overline{A}$, in the position $2p3+1$ (signal G3, Table I). When $n$ call pulses have been sent for assuring the selective calling of the $n$ secondary stations, the cycle controller KG shifts to the position $2p3+1+n$ (see Table I) and delivers a signal G$on$ which controls the setting to the 1 state of the flip-flop A. A new interrogation cycle starts then immediately.

Among the signals elaborated in the circuits just described the signals L$b$, L$a$, H$l$, H$ol$ to H$oq$, are applied to the transmitter TR1 of the satellite in such a way as to control the sending of the synchronization signals, the sending of one counting pulse and the programming of the data exchange. Each of the signals G$ol$ to G$on$ which characterize the calling of one of the stations 1 to $n$ is applied to the circuit DP which receives also, over the group of conductors U$a$, the data received from the selected secondary stations.

As has been seen previously, the first information sent by the selected station $j$ is its identification code. This identification code is detected in the receiver RV1, the corresponding signal U$j$ is compared to the signal G$j$. If the logical condition U$j$xG$j$ is fulfilled, one is assured that the information received come from the selected station.

It will be noted that the signal M2 represented on the FIG. 2($e$) is not used in the circuits, its duration T'2 being defined by the signals H$ol$ to H$oq$.

Figure 4:
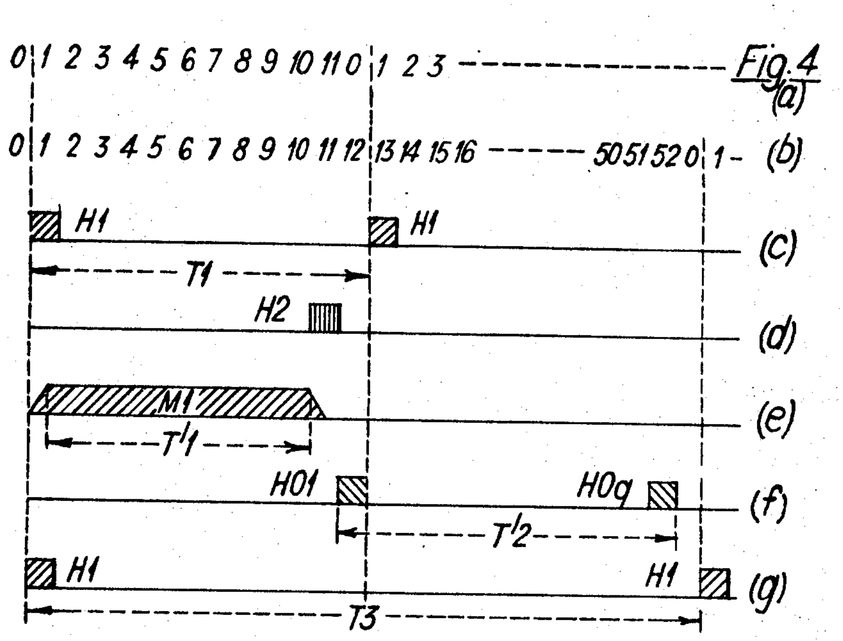

The FIGS. 4($a$) to 4($g$) represent diagrams of signals related to the operation of the interrogation selector KH in the two cases which have been studied: when the interrogated station is out of sight—the numbers stored in the counter are indicated FIG. 4(*a*)—; and when this station is in sight—the numbers stored are indicated FIG. 4(*b*). In order to set up these figures, one has chosen $p1=10$ and $p2=40$. The FIGS. 4(*c*), 4(*d*), 4(*e*), represent the signals H1, H2, M1 when the interrogated station is out of sight. The FIGS. 4(*g*) and 4(*f*) represent the signals H1, H*ol* to H*oq* when the station is in sight. From these figures, one may write:

$T1=(p1+2)xt$ $T'1\simeq p1xt$ $T'2=p2xt$ $T3=T1+T'2=(p1+p2+2)xt.$

Figure 5:
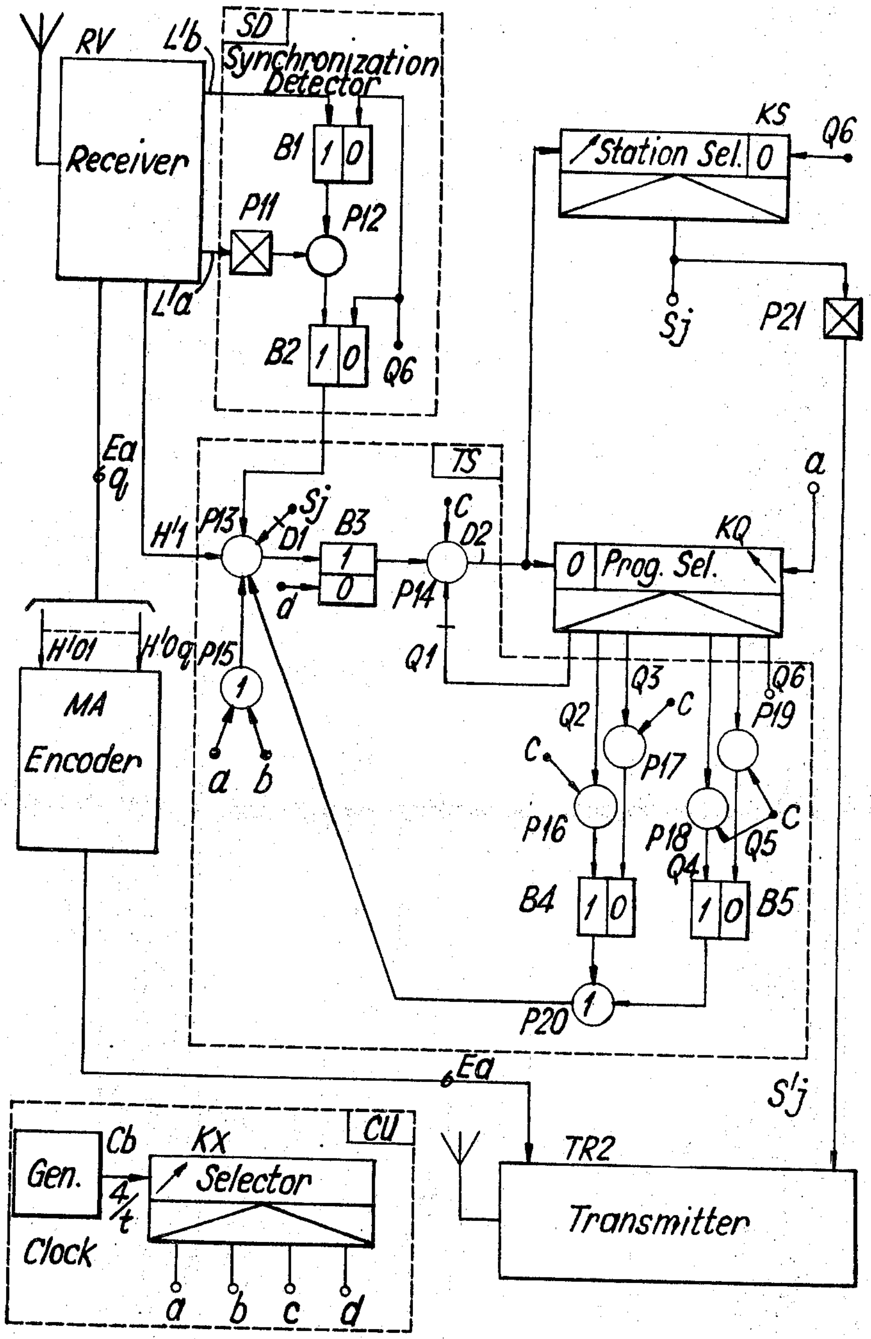

FIG. 5 represents the circuits placed on board of a secondary station, the station *j*, for instance. They comprise:

- the receiver RV2 and the transmitter TR2;
- the circuit MA which carriers out the different measures and encodes the results in order to transmit them to the main station when the station is selected. It will be remembered that the first information transmitted is the identification code of this secondary station;
- the synchronization signal detector SD which delivers a signal B2 during the time interval included between the beginning of an interrogation cycle and the selection of the station $(j+1)$;
- the time selection circuit TS which comprises the flip-flops B3, B4, B5 and the gates P13 to P20;
- the clock CU comprising the generator C*b* which supplies signals of frequency $4/t$ applied to the selector KX. This latter delivers repetitively basic time slot signals *a, b, c, d* of duration equal to $t/4$ and of frequency $1/t$;
- the station selector KS which advances by one position at the reception of each call pulse and which delivers a signal S*j* at the reception of the $j^{th}$ call signal;
- the program selector KQ which advances by one position at each signal *a* and which comprises the output terminals Q1 to Q6. The signals Q2, Q3 and Q4, Q5 are applied to the flip-flops B4 and B5 of the circuit TS which deliver, when in the 1 state, strobe signals defining respectively the time delays T1 and T3 with respect to the reception time of a call pulse.

At the beginning of the cycle, the signals of frequency F*b* and F*a* transmitted successively by the satellite are received by the receiver RV2 and one obtains, after decoding, signals L'*b* and L'*a* which are applied to the synchronization signal detector. The signal L'*b* sets the flip-flop B1 to the 1 state then the trailing edge of the signal L'*a* (differentiating circuit P11, AND circuit P12) sets the flip-flop B2 in the 1 state so that the condition B2 is present just at the end of the reception of the synchronization signal. Both flip-flops B1 and B2 are reset to the 0 state by the signal Q6.

The call pulses H1 transmitted by the transmitter TR1, FIG. 3, are also received by the receiver RV2 and are transformed, by the detection, into pulses H'1 of duration *t*, which are applied to the gate P13. This gate is activated for the logical condition:

$D1=H'1 \text{ x } B2 \text{ x } (B4+B5) \text{ x } (a+b) \text{ x } \overline{Sj}$, (i.e. when the call pulse coincides with a strobe signal, and before the selection of the station (in fact, it will be seen further on that a signal Q6 appears after said selection controlling the resetting to 0 state of the flip-flop B2).

The signal D1 is applied to the flip-flop B3 reset to the 0 state at the time *d*, so that it is in the 1 state at least at the time *c* and the gate P14 delivers a signal D2 for the condition $B3 \text{ x } \overline{Q}1 \text{ x } c$. This signal controls, first the advance by one position of the selector KS, and second the clearing of the selector KQ. This selector KQ advances by one position at each signal *a* and it remains on each position for a duration of approximately *t* equal to that of one call pulse. Table III hereafter gives the correspondences between the positions of this selector and the signals it delivers:

TABLE III

| Signals: | Positions |
|---|---|
| Q1 | **1** |
| Q2 | $p1+1$ |
| Q3 | $p1+3$ |
| * * * * | * |
| Q4 | $p1+p2+1$ |
| Q5 | $p1+p2+3$ |
| Q6 | $p1+p2+4$ |

The signals Q2 and Q3 are applied at the time c (gates P16, P17) to the flip-flop B4 so that this latter remains in the 1 state for a duration of approximately 2t cenered on a time delay T1 with respect to the starting of the counter. The flip-flop B5, controlled by the gates P18, P19, sets up a similar strobe signal centered on a time delay T3. These strobe signals, applied to the gate P13, enable a certain protection against the action of spurious signals taking into account the relative drift between the signals supplied by the generator Ca of the main station (FIG. 3) and by the generator C*b* (FIG. 5).

Figure 6:
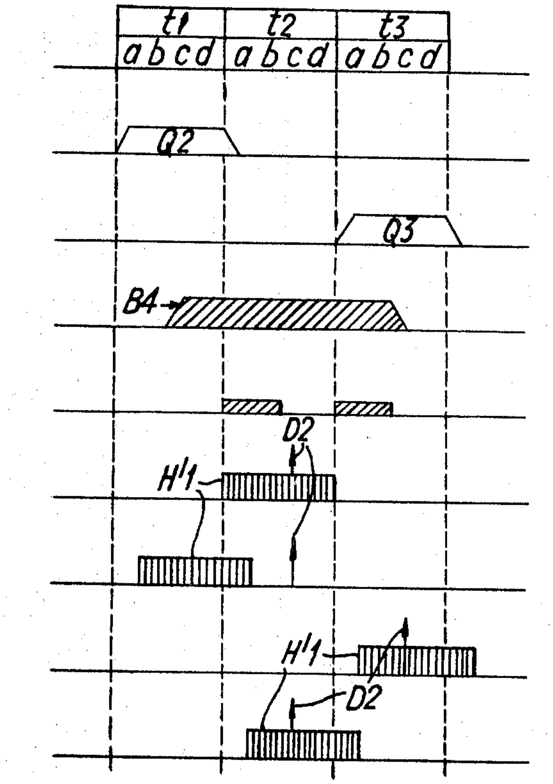

The FIGS. 6(*a*) to 6(*i*) represent diagrams of signals related to the elaboration of the signal D2. On the FIG. 6(*a*) the basic time slots *a, b, c, d* of the three successive times *t*1, *t*2, *t*3 of the duration *t* have been represented. The FIGS. 6(*b*), 6(*c*) represent the signals Q2 and Q3 and the FIG. 6(*d*) represents the strobe signal B4 centered on the time *t*2 at which a pulse H'1 should be received if the generators were not drifting and if they were perfectly synchronized. It has been assumed that the setting up time of a new code in the counter was 0, 5 basic time slot. The FIG. 6(*e*) represents the signals $B4x(a+b)$ which activate the gate P13. The FIG. 6(*f*) represents the ideal position of the pulse H'1 and the time of elaboration of the signal D2. The FIGS. 6(*g*) and 6(*h*) represent the extreme positions which may be reached by this pulse H'1 without disturbing the operation of the circuit. It is seen that the permissible drift is very high $(-3,+5$ basic time slots) this enabling to equip the satellite and the stations with signal generators of a relatively low stability. The FIG. 6(*i*) represents a particular position of the pulse H'1 which coincides with both signals of the FIG. 6(*h*), this induces twice successively, in $t2 \text{ x } b$ and in $t3 \text{ x } a$, the setting to the 1 state of the flip-flop B3. In order to avoid that the selector KQ could not also be cleared twice successively, the signal Q1 blocks the gate P14: thus, at time *t*2x*c*, the signal B3 controls the clearing of the selector, at time *t*3x*a* this latter advances by one position and delivers a signal Q1, and at time *t*3x*c* the signal B3 is blocked by the gate P14.

The operation of the circuits of FIG. 5 in the various cases which may occur, will now be described.

(1) The station *j* is not selected—Each signal D2, which corresponds to a call pulse, controls the advance by one position of the selector KS which delivers a signal $\overline{Sj}$ and the clearing of the selector KQ. If the next pulse H'1 is received with a time delay T1 or T3, the corresponding signal D2 controls the same operations. In the opposite case, or if the station receives no signal at all, the counter KO advances further on up to the time when it delivers a signal Q6 which controls the clearing of the selector KS and of the flip-flops B1 and B2 so that the station is out of circuit up to the reception of the next synchronization signal.

(2) The station *j* is selected—This occurs when the $j^{th}$ signal D2, applied to the selector KS, controls the elaboration of a signal S*j* which blocks the gate P13. The leading edge of this signal, differentiated by the circuit P21, supplies a signal S*j* which coincides practically with the signal D2 and the time delay of which is T0 with respect to the pulse H1 transmitted by the satellite—see FIG. 2(*g*). This signal S'*j* is transmitted to the main station through the transmitter TR2 and it is received by this latter with a time delay 2T0 (signal S″j, FIG. 2(*f*)). The signal D2 controls also the clearing of the selector KQ which advances afterwards by one position at each signal but the strobe signals B4 and B5 can have no action since the gate P13 is blocked by the signal S*j*. The informations transmitted by the main station under the control of the signals H*o*1 *to Hoq*—see FIG. 2(*e*)—are detected and decoded by the receiver RV2. This latter delivers corresponding signals H′*o*1 to H′*oq* which are applied to the circuit MA over the group of conductor E*a* for controlling the sending of information to the main station (indentification code end results of the measurements). The signals H*o*1 to H*oq* are transmitted by the satellite with a delay T1 with respect to the counting pulse and they are thus received by the station with the same time delay with respect to the signal D2 (see FIGS. 2(*e*) and 2(*g*)). It results therefrom that the selector KQ, which receives advance signals after its clearing advances in synchronism with the reception of these signals and that a short time after the reception of the signal H*oq* it delivers a signal Q6 which acts as it has been described above (blocking of the secondary station up to the next synchronization signal). Owing to this synchronism between the reception of the signals H*o*1 to H*oq* and the advance of the selector KQ, it is realized that one could, as the case may be, elaborate program signals by means of this selector for the control of the transmission of information towards the satellite. It will be noted that the code stored in the counter of the selector KS may be used as identification code of the selected station, when a signal S*j* is present.

While the principles of the above invention have been described in connection with specific embodiments and particular modifications thereof it is to be clearly understood that this description is made by way of example and not as a limitation of the scope of the invention.

What is claimed is:

1. In a radio network, a main station equipped with a transmitter and a receiver, a plurality of secondary stations each equipped with a receiver and a transmitter, and a selective calling system associated with said main station for signaling successively, during an interrogation cycle, all secondary stations in line of sight of said main stations, wherein the improvement comprises:
   - means in the main station for providing synchronization signals to enable all secondary stations within range to synchronize to receive calling signals at essentially the same time,
   - means in the main station for transmitting calling signals to each of the secondary stations constituting the network, said calling signals including pulses separated initially by a time interval T1 when the first called station does not answer and means extending the time between pulses to a time interval T3, when a return signal is received from the first station, the time interval T3–T1 being used for information exchange from the responding called station to the main station;
   - means in each secondary station comprising first means for interpreting the calling information, second means activated when a particular station is called to return the calling signal to the main station during the time interval T1, and third means activated within the time interval T3–T1 for transmitting data from said particular station to the main station.

2. A main station in a radio network as claimed in claim 1, in which
   - the means for transmitting calling signals provides a signal pulse at the beginning of each time T1; and
   - the means for providing the time intervals T1 and T3 include an interrogation selector which receives signals from a signal generator when the synchronization signal has been transmitted.

3. A main station in a radio network as claimed in claim 1, in which
   - the means for transmitting calling signals produces first, second and third signals,
   - the first signals being interrogation signals H1 corresponding to the pulses of claim 1, said signals being transmitted to all stations of the network,
   - the second signal M1 having a duration less than the period defining the time interval T1, and
   - the third signal occurring after the time T1 including a set of program signals controlling the data exchange between said main station and the called station.

4. In each secondary station of a network according to claim 1,
   - clock means comprising a signal generator delivering time slot signals of repetition period *t*/4 applied to a counter by four delivering basic time slot signals *a*, *b*, *c*, *d* of duration *t*/4 and repetition period *t*;
   - means for detecting the synchronization signal;
   - means for providing an enable signal at the reception of said synchronization signal;
   - means for providing a first and a second time slot signal centered respectively on times T1 and T3 comprising a program selector advancing by one step at each signal *a* and delivering a signal Q1 at its first position, signals Q2 and Q3 centered on time T1, signals Q4 and Q5 centered on time T3 and signal Q6 just following signal Q6;
   - time selection means comprising a first, a second and a third flip-flop and first and second coincidence gates, means for applying, at time slot *c*, signals Q2 and Q3 to the 1 and 0 input terminals of the first flip-flop and signals Q4 and Q5 to the 1 and 0 input terminals of the second flip-flop, said first coincidence gate delivering a signal D1 if it receives simultaneously, at times *a* or *b*, an interrogation signal delivered by the receiver, an enable signal, and a signal S*j*, said signal D1 being applied to the 1 input of the third flip-fllop which is reset to 0 state at each *d*, the 1 output of said third flip-flop being applied to a first input terminal of the second coincidence gate which delivers a signal Q1 at a time *c*;
   - means for applying said signal D2, as a clearing signal, to the program selector and, as an advance signal, to a station selector, said station selector delivering, when placed in the *j*th station of the network, a selection signal S*j* if it has received *j* signals D2;
   - means for differentiating the leading edge of said signal S*j*,
   - means for applying the differentiated signal to the transmitter which sends it as a return signal;
   - means for transmitting data to the main station when a signal S*j* is present.

References Cited

UNITED STATES PATENTS

| | | | |
|---|---|---|---|
| 3,104,392 | 9/1963 | Towler | 325—55 XR |
| 3,141,928 | 7/1964 | Davy et al. | 325—55 XR |
| 3,320,611 | 5/1967 | Sekimoto et al. | 325—15 XR |
| 3,384,873 | 5/1968 | Sharma | 325—55 XR |

ROBERT L. GRIFFIN, Primary Examiner

K. W. WEINSTEIN, Assistant Examiner

U.S. Cl. X.R.

325—53, 58